United States Patent Office 3,519,712
Patented July 7, 1970

3,519,712
THERAPEUTIC COMPOSITIONS COMPRISING N-METHYLGLUCAMINE AND COUMERMYCIN OR SALTS THEREOF
Harold Leon Newmark, Maplewood, N.J., assignor to Hoffmann-La Roche Inc., Nutley, N.J., a corporation of New Jersey
No Drawing. Filed Oct. 4, 1965, Ser. No. 492,927
Int. Cl. A61k 21/00
U.S. Cl. 424—180                              15 Claims

ABSTRACT OF THE DISCLOSURE

Compositions comprising from about 0.5 to about 100 moles of N-methylglucamine per mole of coumermycin or its salts and which result in higher blood levels at relatively low dosages are disclosed.

---

This invention relates in general to novel therapeutic compositions. More particularly, it relates to compositions which contain an antimicrobial agent as the principle active ingredient.

The coumermycin complex and salts thereof with medicinally acceptable bases constitute a class of known compounds. The members of the coumermycin complex are compounds of the following structural formula:

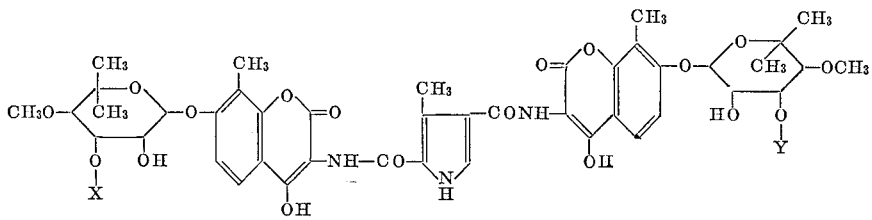

I wherein X and Y are selected from the group consisting of

1)
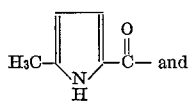
and

2)
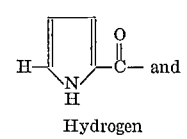
and

3) Hydrogen and salts thereof with medicinally acceptable bases. The most important members of the coumermycin complex are compounds having the formula:

with medicinally acceptable bases. The term coumermycin is used herein also to denote mixtures of each of the compounds encompassed by Formulas I and II with each other and/or salts thereof and mixtures of such salts.

Coumermycin is a valuable antimicrobial agent. Its usefulness, however, has heretofore been limited by the difficulties inherent in its administration. For example, its usefulness on oral administration has been severely hampered by its poor, inefficient and inconsistent absorption into the blood stream from the gastro intestinal tract. Such absorption characteristics make it necessary to administer orally high dosages of coumermycin to obtain acceptable blood levels. Inherent in the administration of high dosages of coumermycin is the concomitant risk of severe toxic reactions. Therefore, it is desirable and even necessary to obtain consistent, efficient and reliable absorption on oral administration of coumermycin before it can be used on a widespread basis. Furthermore, the use of coumermycin on parenteral administration has also been severely limited. For example, intramuscular administration of coumermycin has been the cause of severe local tissue irritation. Intravenous administration has been unsatisfactory because coumermycin is not readily soluble in solvent systems safe and acceptable for intravenous use. Consequently, there is an unquestioned need for a coumermycin composition which is effective when administered in relatively low dosages; for a coumermycin composition which, when administered intramuscularly will cause little or no tissue irritation, and for a coumermycin composition which is readily soluble in solvent systems acceptable for intravenous use. Most importantly, and preferably, there is a need for coumermycin in a form suitable for oral administration which will reliably produce effective blood levels.

It has now been found that compositions containing coumermycin in admixture with N-methylglucamine will give high blood levels at relatively low dosages on either oral or parenteral administration. Furthermore, the employment of N-methylglucamine in conjunction with coumermycin results in a composition which readily goes into and remains in solution, thus, facilitating parenteral

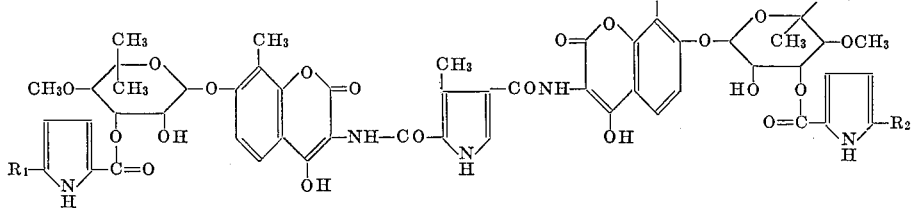

II wherein $R_1$ is hydrogen or methyl and $R_2$ is hydrogen or methyl and salts thereof with medicinally acceptable bases.

The term "coumermycin," as used herein, shall denote individually each of the compounds encompassed by Formulas I and II and each of the salts of such compounds administration thereof. Local tissue irritation is greatly minimized by parenteral administration of coumermycin in conjunction with N-methylglucamine. Intravenous administration is greatly facilitated because of the substantially enhanced solubility of coumermycin mixtures with N-methylglucamine.

The compositions of this invention comprise the mixture of coumermycin with N-methylglucamine as noted above. Coumermycin, as has already been indicated, can be used either as a free acid or the salt of the free acid. Thus, salts of the free acid of coumermycin which can be used in the present invention include alkali metal salts, e.g., sodium, alkaline earth metal salts, e.g., magnesium and calcium; aluminum; zinc; amines, e.g., diethanolamine and triethanolamine. It will be understood that in addition to the enumerated salts, other common pharmaceutically acceptable base addition salts can be used.

In addition to N-methylglucamine and coumermycin, the compositions of this invention can contain pharmaceutically acceptable adjuvant or excipient materials. Adjuvants or excipients such as fillers, e.g., lactose, calcium phosphate; disintegrating agents, e.g., corn starch; lubricants, such as talc, magnesium stearate, calcuim stearate, etc. can be readily employed. It should be fully understood that other such adjuvant materials, the identity and use of which are well known in the art, can also be used in carrying out this invention.

In general, the compositions of this invention are prepared merely by admixing N-methylglucamine with coumermycin. The quantities of N-methylglucamine and coumermycin to be used in the preparation of the instant compositions can, as a rule, be varied within rather wide ranges. Generally, a ratio of from about 0.5 mole to about 100 moles of N-methylglucamine per mole of coumermycin is used. It is preferable, however, to use a ratio of from about 2 moles of N-methylglucamine to about 25 moles of N-methylglucamine per mole of coumermycin. The mixture in solid form can be encapsulated or made into tablets by conventional procedures. If solutions are desired for oral or parenteral administration, N-methylglucamine and coumermycin either separately or in admixture can be dissolved in pharmaceutically acceptable solvents such as water, glycerine, propylene glycol, alcohol or other known solvents or mixtures thereof by methods well known in the art. Pharmaceutical excipients and adjuvants can also be added if desired. It will be understood that the ratio of active ingredients to pharmaceutical adjuvants will vary considerably depending on the product and the form in which it is to be administered.

The compositions of this invention can contain, as optional ingredients, other antimicrobial agents in addition to coumermycin. Such optional ingredients include antibiotic or antibacterial agents such as sulfonamides, tetracyclines an novobiocin. For example, there can be added to the compositions of this invention 5-methyl-3-sulfanilamidoisoxazole, 3,4-dimethyl-5-sulfanilamidoisoxazole, 2,4-dimethoxy - 6 - sulfanilamido-1,3-diazine (sulfadimethoxine) and 4-sulfanilamido-5,6-dimethoxy-pyrimidine and their respective soluble salts, i.e., alkali metal, alkaline earth metal, N-methylglucamine, etc. When employing compositions of this invention in combination with another antimicrobial agent containing one or more free acidic groups, it is preferred to use a quantity of N-methyl-glucamine in excess of that ordinarily used in the absence of such other antimicrobial agent. More specifically, whenever an antimicrobial agent, which contains a free acidic group or which ionizes as an acid in pH range up to pH 10, is added to the coumermycin-N-methylglucamine compositions of this invention, it is preferred to add one mole equivalent of N-methylglucamine per each free acidic group of said antimicrobial agent. However, it should be recognized that if said antimicrobial substance, i.e., other than coumermycin, is added to the mixture in a water soluble form, e.g., in the form of an alkali metal salt such as a sodium salt or in the form of any other base salt, e.g., triethanolamine or diethanolamine salt of said antimicrobial agent, then there is no need for additional N-methylglucamine. Thus, it is preferred to add N-methylglucamine only when the antimicrobial agent other than coumermycin which is to be added to the mixture contains a free acidic group or is in a form which will ionize as an acid in a pH range up to pH 10.

The mixture of coumermycin with N-methylglucamine and another antimicrobial agent can be formulated by appropriate methods into the desired oral or parenteral dosage forms. It will be understood that the quantities of the active materials and N-methylglucamine can be varied widely depending upon the requirements of the patient.

In general, the desired dosage can be administered in the form of tablets, capsules, suppositories, suspensions, solutions and emulsions. As indicated heretofore the various dosage forms can be prepared by conventional methods well-known to the art. For example, the compositions can be compressed by usual methods into single or multi-layer tablets. Moreover, the preparations can be produced in the form of coated tablets or filled into conventional hard shell capsules. The methods and techniques which will be most suitable for use in formulating appropriate dosage forms from the present compositions will be readily apparent to those skilled in the art.

Typical oral dosages of the compositions of this invention will vary. For example, in the case of capsules containing 50 mg. of coumermycin and 200 mg. of N-methylglucamine, a typical oral dosage for an adult is 1 capsule every 4 hours. In the case of the capsule containing 100 mg. of coumermycin and 300 to 400 mg. of N-methylglucamine, a typical oral dosage for an adult would be 1 capsule every 8 hours. It should be understood that the typical dosages are exemplary only and do not limit the scope or the practice of the present invention.

As indicated heretofore, this invention serves to provide coumermycin in dosage forms suitable for treating antimicrobial infections. The invention is of particular significance since it provides a method of producing capsules and tablets which can be prescribed for administration to the patient in his home. Such tablets and capsules, because of the reliable and consistent absorption into the blood stream, can be self-administered without the presence of medically trained personnel. The efficiency of the instant compositions is apparent from Table I which follows hereinafter. Table I, compares the blood levels produced by the administration of 250 mg. capsule dosages of coumermycin alone and in combination with N-methylglucamine, the N-methylglucamine being present in the capsules in a ratio of four parts by weight of N-methylglucamine per each part by weight of coumermycin.

TABLE I.—HUMAN BLOOD LEVELS

| Dosage form [1] | Hours after oral dose (mcg./ml.) | | | |
|---|---|---|---|---|
| | 2 | 4 | 8 | 24 |
| Drug alone | | 0.04 | 0.46 | 0.10 |
| | | 0.02 | 0.29 | 0.08 |
| | | 0.05 | 0.25 | 0.15 |
| | | 0.10 | 0.15 | 0.05 |
| | <0.01 | 0.09 | 0.34 | 0.44 |
| | 0.11 | 0.56 | 0.52 | 0.12 |
| Average | | 0.14 | 0.34 | 0.16 |
| Drug+N-methylglucamine | 1.5 | 1.3 | 1.3 | 0.60 |
| | 1.2 | 2.0 | 3.2 | 0.74 |
| | 0.25 | 3.1 | 4.0 | 1.2 |
| | 0.66 | 3.1 | 1.3 | 0.40 |
| | 0.56 | 2.2 | 2.6 | 0.72 |
| | 1.5 | 2.8 | 2.4 | 0.58 |
| Average | 0.94 | 2.4 | 2.5 | 0.71 |

[1] All patients received a total of 250 mg. per dose.

The foregoing table clearly reveals that the capsules containing N-methylglucamine are about 700 percent more effective.

For a fuller understanding of the nature and objects of this invention, reference may be had to the following examples which are given merely as further illustrations of the invention and are not to be construed in a limiting sense.

EXAMPLE 1

The following named ingredients, in the quantities hereinafter indicated were intimately mixed in a suitable container:

| Ingredient: | Mg. per capsule |
|---|---|
| Coumermycin (mono-sodium salt) | 50 |
| N-methylglucamine | 200 |
| Lactose | 140 |
| Talc | 85 |
| Corn starch | 45 |

The above ingredients were ground together in a mortar until uniform and then filled into a gelatin capsule. Oral administration of gelatin capsules so produced resulted in uniform absorption and effective blood levels.

EXAMPLE 2

In this example, gelatin capsules were produced by the procedure of Example 1, using, with but one exception, the same ingredients and the same quantities as were employed in Example 1. Said one exception resided in the use of the free acid of coumermycin in place of the mono-sodium salt. The capsules so produced were equivalent in potency to the capsules prepared in Example 1.

EXAMPLE 3

(A) In this example, gelatin capsules were produced by the procedure of Example 1, using, with but one exception, the same ingredients and the same quantities of each as were employed in Example 1. Said one exception resided in the use of the magnesium salt of coumermycin in lieu of the mono-sodium salt of coumermycin.

(B) In this example, gelatin capsules were produced by the procedure of Example 1, using, with but one exception, the same ingredients and the same quantities of each as were employed in Example 1. Said one exception resided in the use of calcium salt of coumermycin in lieu of the mono-sodium salt.

(C) In this example, gelatin capsules were produced by the procedure of Example 1, using, with but one exception, the same ingredients and the same quantities of each as were employed in Example 1. Said one exception resided in the use of aluminum salt of coumermycin in lieu of the mono-sodium salt.

In each of A, B, and C of this example, the capsules so produced were equivalent in potency to the capsules prepared in Example 1.

EXAMPLE 4

The following named ingredients, in the quantities and ingredients hereinafter indicated, were mixed in a suitable vessel:

| Ingredients: | Mg. per capsule |
|---|---|
| Coumermycin | 25 |
| N-methylglucamine | 250 |
| Sulfadimethoxine | 200 |
| Lactose | 150 |
| Talc | 100 |
| Corn starch | 50 |

The above ingredients were ground together in a mortar until uniform and then filled into a gelatin capsule.

EXAMPLE 5

Preparation of injectable (sodium salt of coumermycin)

110 mg. of the mono-sodium salt of coumermycin (which includes about 5 to 7% water of hydration) were suspended in 1 ml. of distilled water to which was added 0.2 ml. of anhydrous ethyl alcohol. The pH of this suspension was 7.3. 10 mg. of N-methylglucamine were added and stirred (pH at this point was 8.6). 1 N sodium hydroxide solution was then added slowly with stirring to a pH of about 9.2–9.3, at which point the composition was in complete solution. Sufficient distilled water was then added to bring the volume to 2.0 ml. The solution was sterilized by bacteriological filtration and filled asptically into a sterile vial and freeze dried (lyophilized). Vials so prepared show excellent physical, chemical, and antibiotic stability for about 3 months at 45° C., and about one year at room temperature.

A vial of lyophilized composition so prepared was reconstituted by the addition of 2 ml. of a diluent containing 10% ethyl alcohol, 20% propylene glycol, and 1% benzyl alcohol in distilled water. The reconstituted solution showed a pH of 9.2 and excellent stability as measured by antimicrobial potency after 1 week at room temperature in solution. Administration by intramuscular or intravenous use produced excellent blood levels in animals and humans of coumermycin with a minimum of detectable local tissue irritation.

What is claimed is:

1. A therapeutic composition comprising a mixture of from about 0.5 mole to about 100 moles of N-methylglucamine per 1 mole of a member selected from the group consisting of a compound having the formula:

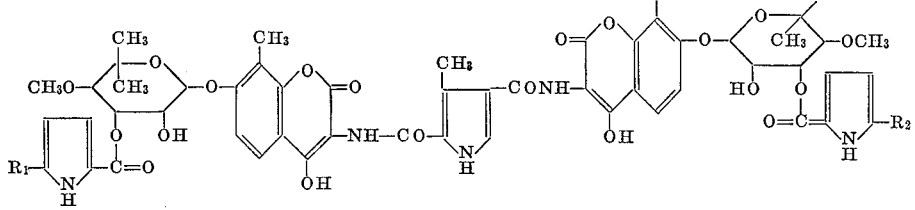

in which $R_1$ is a member selected from the group consisting of hydrogen and methyl and in which $R_2$ is a member selected from the group consisting of hydrogen and methyl and salts thereof with a medicinally acceptable base.

2. A composition according to claim 1 wherein $R_1$ and $R_2$ are each methyl.

3. A therapeutic composition comprising a mixture of from about 0.5 mole to about 100 moles of N-methylglucamine per 1 mole of coumermycin.

4. A therapeutic composition comprising a mixture of from about 0.5 mole to about 100 moles of N-methylglucamine per 1 mole of a salt of coumermycin.

5. A composition according to claim 4 in which the salt of coumermycin is an alkali metal salt.

6. A composition according to claim 4 in which the salt of coumermycin is an alkaline earth metal salt.

7. A therapeutic composition comprising a mixture of from about 0.5 mole to about 100 moles of N-methylglucamine per 1 mole of a sodium salt of coumermycin.

8. A therapeutic composition comprising a mixture of from about 0.5 mole to about 100 moles of N-methylglucamine per 1 mole of a member selected from the group consisting of aluminum, zinc and a magnesium salt of coumermycin.

9. A therapeutic composition in unit dosage form comprising a mixture of from about 0.5 mole to about 100 moles of N-methylglucamine per 1 mole of coumermycin.

10. A therapeutic composition in unit dosage form comprising a mixture of from about 0.5 mole to about 100 moles of N-methylglucamine per 1 mole of a salt of coumermycin.

11. A method of achieving high blood levels of coumermycin in patients which comprises administering to such patients an effective amount of a composition comprising a mixture of from about 0.5 mole to about 100 moles of N-methylglucamine per 1 mole of coumermycin.

12. A method of achieving high blood levels of coumermycin in patients which comprises administering to such patients an effective amount of a composition comprising a mixture of from about 0.5 mole to about 100 moles of N-methylglucamine per 1 mole of a salt of coumermycin.

13. A method of achieving high blood levels of coumermycin in patients which comprises administering to such patients an effective amount of a composition comprising a mixture of from about 0.5 mole to about 100 moles of N-methylglucamine per 1 mole of a salt of coumermycin, and pharmaceutically acceptable adjuvants.

14. A therapeutic composition comprising from about 0.5 mole to about 100 moles of N-methylglucamine per 1 mole of coumermycin, and a sulfonamide selected from the group consisting of 5-methyl-3-sulfanilamidoisoxazole, 3,4-dimethyl-5 - sulfanilamidoisoxazole, 2,4-dimethoxy-6-sulfanilamido-1,3-diazine, 4-sulfanilamido-5,6-dimethoxy-pyrimidine and pharmaceutically acceptable soluble salts thereof.

15. The therapeutic composition of claim 1 wherein the sulfonamide is 2,4-dimethoxy-6-sulfanilamido-1,3- diazine.

References Cited

UNITED STATES PATENTS

| | | | |
|---|---|---|---|
| 2,161,114 | 6/1939 | Volwiler | 260—211 |
| 2,233,419 | 3/1941 | Moore | 260—211 |
| 2,342,957 | 2/1944 | Moore | 260—211 |
| 2,606,200 | 8/1952 | Matson | 260—211 |
| 2,919,229 | 12/1959 | Freedman | 260—211 |
| 3,175,944 | 3/1965 | Hoeksema. | |
| 3,201,386 | 8/1965 | Kawaguchi et al. | |

FOREIGN PATENTS 815,518   6/1959   Great Britain.

OTHER REFERENCES

Kawaguchi et al. (II), The Journal of Antibiotics, Ser. A, vol. 18, No. 1, pp. 11–25 (January 1965).

ALBERT T. MEYERS, Primary Examiner

V. D. TURNER, Assistant Examiner

U.S. Cl. X.R.

424—181